(12) United States Patent
Park

(10) Patent No.: US 12,716,503 B2
(45) Date of Patent: Aug. 25, 2026

(54) SEALING ASSEMBLY HAVING A PRIMARY AND A SECONDARY SEAL

(71) Applicant: The Boeing Company, Arlington, VA (US)

(72) Inventor: Daniel Park, Ofallon, MO (US)

(73) Assignee: The Boeing Company, Arlington, VA (US)

( * ) Notice: Subject to any disclaimer, the term of this patent is extended or adjusted under 35 U.S.C. 154(b) by 160 days.

(21) Appl. No.: 18/448,836

(22) Filed: Aug. 11, 2023

(65) Prior Publication Data

US 2025/0052323 A1 Feb. 13, 2025

(51) Int. Cl.
*F16J 15/38* (2006.01)
*F16J 15/3284* (2016.01)
*F16J 15/34* (2006.01)

(52) U.S. Cl.
CPC .......... *F16J 15/38* (2013.01); *F16J 15/3404* (2013.01); *F16J 15/3284* (2013.01)

(58) Field of Classification Search
CPC ....... F16J 15/3284; F16J 15/3404; F16J 15/38
See application file for complete search history.

(56) References Cited

U.S. PATENT DOCUMENTS 3,627,390 A * 12/1971 Irwin .................. F16C 33/7886 277/433
4,095,807 A * 6/1978 Jandt .................... F16J 15/3404 277/374
4,277,072 A * 7/1981 Forch ..................... F16J 15/164 277/377
6,257,589 B1 7/2001 Flaherty et al.
8,403,333 B2 * 3/2013 Berdichevsky ........ F16J 15/164 277/433
9,395,000 B2 * 7/2016 Griffith .................... F16J 15/40
9,915,349 B2 * 3/2018 Broadbent ........... F16J 15/3256
11,231,110 B2 * 1/2022 Specht ................. F16J 15/3404
2011/0198813 A1 * 8/2011 Takahashi ............. F04D 29/126 277/387
2012/0068419 A1 * 3/2012 Berdichevsky ........ F16J 15/164 277/549
2016/0053896 A1 * 2/2016 Griffith ................ F16J 15/3404 277/350
2020/0080647 A1 * 3/2020 Specht .................. F16J 15/164

* cited by examiner

*Primary Examiner* — Nicholas L Foster
(74) *Attorney, Agent, or Firm* — Massey Bean & Lewis

(57) ABSTRACT

A sealing assembly and associated shaft assembly is disclosed. The sealing assembly comprises a primary seal at a sealing interface between a first sealing face of a first seal ring and a second sealing face of a second seal ring. The sealing assembly also comprises a secondary seal between an extension member of a resilient flexible seal and a second circumferential surface of the second seal ring. The resilient flexible seal is coupled to the first seal ring. The first seal ring is rotatable, relative to the second seal ring, and the extension member is configured to disengage from the second circumferential surface of the second seal ring when the first seal ring is rotating, relative to the second seal ring, at or above a threshold speed.

20 Claims, 9 Drawing Sheets

SEALING ASSEMBLY HAVING A PRIMARY AND A SECONDARY SEAL

FIELD

This disclosure relates generally to a sealing assembly, and more particularly to a sealing assembly having a primary seal and a secondary seal.

BACKGROUND

Mechanical seals, such as a cartridge-style shaft seal, are commonly used at an interface between a stationary housing and a rotating shaft to provide a dynamic seal while the shaft is rotating. Such seals include a first ring, co-rotatable with and mounted on the shaft, and a second stationary ring, mounted on the housing.

Commonly, these mechanical seals are used in aviation compressors, such as refrigeration compressors. While the compressor is in operation, the mechanical seal maintains a dynamic seal through the interface between the rotating ring and the stationary ring. However, issues arise when the compressor is stopped, as significant temperature increases and a buildup of pressure from the fluid (e.g., liquid or gas) within the compressor can result in leaks through the dynamic seal. In some situations, leaks through the dynamic seal may be accepted and addressed by replenishing any lost fluid. But in other industries, such as aviation, leaks of any kind are not tolerated.

To address the challenges posed by leakage, certain compressors have been enclosed within hermetically sealed shells as a mitigation measure. However, in weight-sensitive applications, like in the aviation industry, adding an extra housing becomes impractical. The presence of leaks in the dynamic seal, when the compressor is not operating, has forced some aircraft refrigeration systems to rely on electric motor-driven compressors instead of shaft-driven compressors, which are also encased within a sealed shell, adding additional weight and bulk.

SUMMARY

The subject matter of the present application has been developed in response to the present state of the art, and in particular, in response to the problems of and needs created by, or not yet fully solved by, conventional mechanical seals. Generally, the subject matter of the present application has been developed to provide a sealing assembly having a primary seal and a secondary seal that overcomes at least some of the above-discussed shortcomings of prior art techniques.

Disclosed herein is a sealing assembly that includes a primary seal at a sealing interface between a first sealing face of a first seal ring and a second sealing face of a second seal ring. The sealing assembly also includes a secondary seal between an extension member of a resilient flexible seal and a second circumferential surface of the second seal ring. The resilient flexible seal is coupled to the first seal ring. The first seal ring is rotatable relative to the second seal ring. The extension member is configured to disengage from the second circumferential surface when the first seal ring is rotating, relative to the second seal ring, at or above a threshold speed. The preceding subject matter of this paragraph characterizes example 1 of the present disclosure.

The first seal ring includes the first sealing face, a first non-sealing face, opposite of the first sealing face, and the first circumferential surface. The second seal ring includes the second sealing face, a second non-sealing face, opposite of the second sealing face and a second circumferential surface. The resilient flexible seal is co-rotatable relative to the first seal ring. When a rotational speed of the first seal ring is below a threshold speed, the extension member is in sealed engagement with the second circumferential surface of the second seal ring. When the rotational speed of the first seal ring is at or above the threshold speed, the extension member is flexed radially away from the second circumferential surface and is disengaged from the second circumferential surface of the second seal ring. The preceding subject matter of this paragraph characterizes example 2 of the present disclosure, wherein example 2 also includes the subject matter according to example 1, above.

The first sealing face is planar and perpendicular to a rotational axis of the first seal ring. The second-sealing face is planar and perpendicular to the rotational axis of the second seal ring. The preceding subject matter of this paragraph characterizes example 3 of the present disclosure, wherein example 3 also includes the subject matter according to any of examples 1-2, above.

The resilient flexible seal is coupled to the first circumferential surface. The preceding subject matter of this paragraph characterizes example 4 of the present disclosure, wherein example 4 also includes the subject matter according to any of examples 1-3, above.

Alternatively, the resilient flexible seal is coupled to an attachment surface of the first seal ring, the attachment surface parallel with or co-planar to the first sealing face. The preceding subject matter of this paragraph characterizes example 5 of the present disclosure, wherein example 5 also includes the subject matter according to any of examples 1-3, above.

The extension member of the resilient flexible seal includes one of an annular rib or an annular groove configured to be in sealed engagement with the second circumferential surface when the rotational speed of the first seal ring is below the threshold speed. The preceding subject matter of this paragraph characterizes example 6 of the present disclosure, wherein example 6 also includes the subject matter according to any of examples 1-5, above.

The second circumferential surface includes one of an annular rib or an annular groove. When the second circumferential surface comprises the annular rib, the extension member comprises a corresponding annular groove, the annular rib of the second circumferential surface configured to be in sealed engagement with the annular groove of the extension member when the rotational speed of the first seal ring is below the threshold speed. When the second circumferential surface comprises the annular groove, the extension member comprises a corresponding annular rib, the annular rib of the extension member configured to be in sealed engagement with the annular groove of the second circumferential surface when the rotational speed of the first seal ring is below the threshold speed. The preceding subject matter of this paragraph characterizes example 7 of the present disclosure, wherein example 7 also includes the subject matter according to example 6, above.

The threshold speed is associated with a centrifugal force sufficient to radially flex the extension member away from the second circumferential surface. The preceding subject matter of this paragraph characterizes example 8 of the present disclosure, wherein example 8 also includes the subject matter according to any of examples 1-7, above.

The extension member of the resilient flexible seal is made of an elastomeric material. The preceding subject matter of this paragraph characterizes example 9 of the present disclosure, wherein example 9 also includes the subject matter according to any of examples 1-8, above.

The second seal ring is made of a carbon-based material. The preceding subject matter of this paragraph characterizes example 10 of the present disclosure, wherein example 10 also includes the subject matter according to any of examples 1-9, above.

The first seal ring has a first profile height. The second seal ring has a second profile height. The second profile height is greater than the first profile height. The preceding subject matter of this paragraph characterizes example 11 of the present disclosure, wherein example 11 also includes the subject matter according to any of examples 1-10, above.

The resilient flexible seal further comprises a second extension member. The second extension member is radially spaced apart from the extension member. The second extension member is more rigid than the extension member. The extension member flexes towards the second extension member when the rotational speed of the first seal ring is at or above the threshold speed. The second extension member prevents further flexing of the extension member beyond the second extension member. The preceding subject matter of this paragraph characterizes example 12 of the present disclosure, wherein example 12 also includes the subject matter according to any of examples 2-11, above.

The second seal ring further comprises a secondary member radially extending from the second circumferential surface. A notch is defined in the secondary member. The extension member of the resilient flexible seal extends within the notch. The notch prevents further flexing of the extension member beyond the notch. The preceding subject matter of this paragraph characterizes example 13 of the present disclosure, wherein example 13 also includes the subject matter according to any of examples 1-12, above.

Further disclosed within is a shaft assembly that includes a housing. The shaft assembly also includes a shaft adjacent to the housing and rotatable, relative to the housing. The shaft assembly further includes a sealing assembly configured to be operatively positioned between the shaft and the housing. The sealing assembly includes a first seal ring, mountable to the shaft, and including a first sealing face, a first non-sealing face, opposite the first sealing face, and a first circumferential surface. The sealing assembly also includes a second seal ring that is mountable on the housing, and includes a second sealing face, a second non-sealing face, opposite the second sealing face, and a second circumferential surface. The first sealing face and the second sealing face are engaged such that a sealing interface is defined between the first sealing face and the second sealing face. The first seal ring is co-rotatable with the shaft, relative to the second seal ring. The second seal ring is static, such that the second seal ring does not rotate, relative to the first seal ring and the shaft. The sealing assembly further includes a resilient flexible seal coupled to the first seal ring and co-rotatable with the first seal ring. The resilient flexible seal including an extension member. When a rotational speed of the first seal ring is below a threshold speed, the extension member is in sealed engagement with the second circumferential surface of the second seal ring. When the rotational speed of the first seal ring is at or above the threshold speed, the extension member is flexed radially away from the second circumferential surface and is disengaged from the second circumferential surface of the second seal ring. The preceding subject matter of this paragraph characterizes example 14 of the present disclosure.

The shaft assembly further includes an outer housing cap. The outer housing cap surrounds at least the second non-sealing face and the second circumferential surface of the second seal ring. The preceding subject matter of this paragraph characterizes example 15 of the present disclosure, wherein example 15 also includes the subject matter according to example 14, above.

A first inner-circumferential surface of the first seal ring is in contact with the shaft such that the first seal ring and the shaft co-rotate, as the shaft is rotated. The preceding subject matter of this paragraph characterizes example 16 of the present disclosure, wherein example 16 also includes the subject matter according to any of examples 14-15, above.

The shaft assembly forms part of a compressor for an aircraft. The preceding subject matter of this paragraph characterizes example 17 of the present disclosure, wherein example 17 also includes the subject matter according to any of examples 14-16, above.

Also disclosed herein is a method of sealing a compressor using a sealing assembly. The method includes forming a primary seal at a sealing interface between a first sealing face of a first seal ring and a second sealing face of a second seal ring. The method also includes forming a secondary seal between an extension member of a resilient flexible seal and a second circumferential surface of the second seal ring. The method further includes rotating the first seal ring, relative to the second seal ring. The method also includes maintaining the secondary seal when a rotational speed of the first seal ring is below a threshold speed. The method additionally includes breaking the secondary seal when the rotational speed of the first seal ring is at or above the threshold speed. The preceding subject matter of this paragraph characterizes example 18 of the present disclosure.

The step of breaking the secondary seal when the rotational speed of the first seal ring is at or above the threshold speed includes generating a centrifugal force sufficient to radially flex the extension member away from the second circumferential surface. The preceding subject matter of this paragraph characterizes example 19 of the present disclosure, wherein example 19 also includes the subject matter according to example 18, above.

The step of forming the secondary seal further includes forming the secondary seal between an annular rib or an annular groove in the extension member of the resilient flexible seal and the second circumferential surface of the second seal ring. The preceding subject matter of this paragraph characterizes example 20 of the present disclosure, wherein example 20 also includes the subject matter according to any of examples 18-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of a sealing assembly and associated shaft assembly and method. The following provides some features of at least some examples of the sealing assembly. The sealing assembly includes a primary seal at a sealing interface between a sealing face of a first seal ring and a sealing face of a second seal ring. The primary seal functions as a dynamic seal, responsible for maintaining an effective seal between a stationary housing and a rotating shaft of a shaft assembly. During operation of a compressor, the primary seal of the shaft assembly actively maintains the sealing interface, effectively preventing fluid (e.g., liquid or gas) leakage. However, whenever the shaft assembly is not operating (i.e., static), the potential for leakage through the sealing interface arises. After the operation of the shaft assembly is ceased, the temperature of the fluid within the shaft assembly increases due to the heat generated during operation, resulting in a high pressure build up within the shaft assembly. Under these conditions, there is an increased risk of leakage at the sealing interface, as the buildup of pressure seeks to escape, and can cause leakage through the primary seal. To address these issues, the sealing assembly incorporates a secondary seal, which serves as a static seal. The secondary seal acts as an additional layer of protection, ensuring that any fluid that leaks through the sealing interface, while the shaft assembly is not operating or is below a threshold speed, is prevented from escape through the sealing assembly. The combination of the primary seal and the secondary seal within the sealing assembly ensures comprehensive sealing performance throughout the operational and nonoperational cycle of the shaft assembly. While the dynamic seal is responsible for maintaining the sealing interface during shaft rotation, the secondary seal acts as a fail-safe mechanism, preventing leakage when the shaft assembly is idle or below a threshold speed. This is particularly important in applications where precise fluid containment is critical, such as compressors used in certain industries like aviation.

Figure 1:
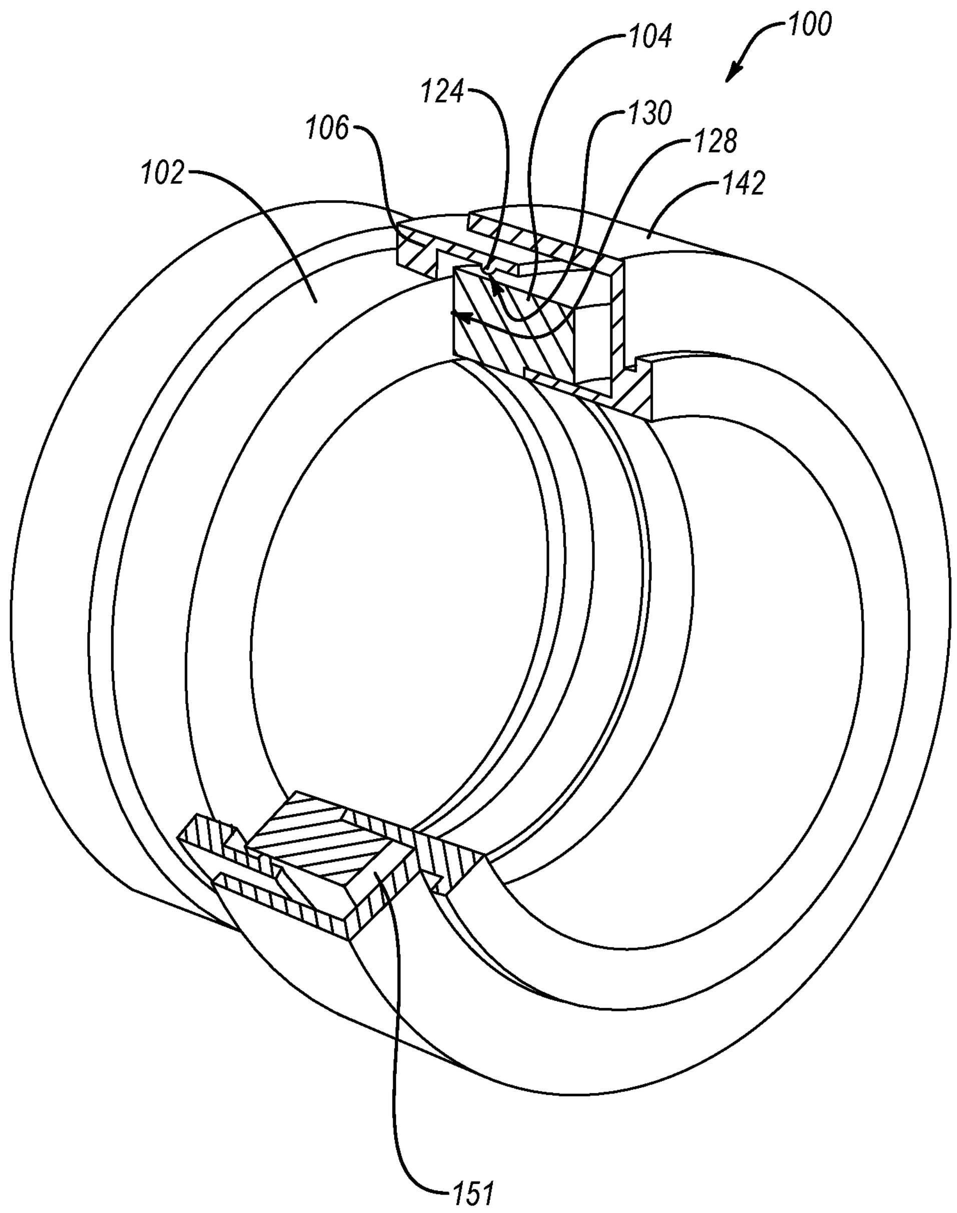
FIG. 1 is a schematic perspective, partial cross-sectional, view of a sealing assembly, according to one or more examples of the present disclosure.

Referring to FIG. 1, a sealing assembly 100, with a partial exposed view, is shown. The sealing assembly 100 includes two seal rings, a first seal ring 102 configured to be mounted to a shaft of a shaft assembly, and a second seal ring 104, configured to be mounted to a housing of the shaft assembly. The shaft and housing of the shaft assembly are not shown. The first seal ring 102 is rotatable, relative to the second seal ring 104, which is stationary. As described in more detailed below, the first seal ring 102 and the second seal ring 104 form a primary seal 128 of the sealing assembly 100, when the first seal ring 102 is rotating, relative to the second seal ring 104. The sealing assembly 100 also includes a resilient flexible seal 106 that is coupled to, and co-rotatable with, the first seal ring 102. An extension member 124 of the resilient flexible seal 106 is configured to sealingly engage with and disengage from the second seal ring 104. As used herein, sealingly engage refers to an action of bringing two mating surfaces or components (e.g., extension member and second seal ring) into close contact or connection in a manner that creates an effective and secure seal. When the surfaces or components are sealingly engaged, they prevent the leakage of fluids (e.g., liquids or gases) between them. Conversely, as used herein, disengage refers to the separation or disconnection of two mating surfaces or components that were previously creating an effective seal. In other words, the seal between the two mating surfaces is broken. When the extension member 124 is sealingly engaged with the second seal ring 104, a secondary seal 130 is formed between the extension member 124 and the second seal ring 104. The extension member 124 is configured to be sealingly engaged with the second seal ring 104 when the first seal ring 102 is not rotating or is below a threshold speed, relative to the second seal ring 104. Moreover, when the extension member 124 is disengaged from the second seal ring 104, the secondary seal 130 is not formed (i.e., broken) between the extension member 124 and the second seal ring 104. The extension member 124 is configured to disengage from the second seal ring 104 when the first seal ring 102 is rotating, relative to the second seal ring 104, at or above a threshold speed. By disengaging the extension member 124 from the second seal ring 104, the primary seal 128 is efficiently sealing the seal assembly 100, ensuring optimal containment of fluids, while concurrently protecting the secondary seal 130 from potential wear or damage due to friction and contact between the extension member 124 and second seal ring 104. That is, disengaging the extension member 124 from the second seal ring 104 at certain rotational speeds helps to prevent such wear and damage and ensures the reliable performance and longevity of the sealing assembly 100.

The sealing assembly 100 may further include an outer housing cap 142 that partially surrounds the second seal ring 104. The outer housing cap 142 partially encloses the second seal ring 104 and keeps the second seal ring 104 within proximity to the first seal ring 102. The outer housing cap 142 may further include a spring feature 151, shown as a flat surface pushing against the second seal ring 104, that maintains the second seal ring 104 in proximity with the first seal ring 102, such that the primary seal 128 is maintained between the first seal ring 102 and the second seal ring 104, when the first seal ring 102 is rotating, relative to the second seal ring 104.

Referring to FIGS. 2-5, a partial cross-section view of some examples of a sealing assembly 100 mounted to a shaft 146 of a shaft assembly 150 are shown. The partial view of these examples shows the sealing assembly 100/shaft assembly 150, with the view ending at a rotational axis 148, however it should be understood that although not shown, a mirror image of the sealing assembly would appear on the opposite side of the rotational axis. The rotational axis 148 is the axis in which the shaft 146 and the first seal ring 102 co-rotate about. The sealing assembly 100 includes the first seal ring 102, the second seal ring 104, and the resilient flexible seal 106. The first seal ring 102 comprises a first inner-circumferential surface 114 (i.e., an inner diameter of the first seal ring 102) and a first circumferential surface 112, spaced apart from the first inner-circumferential surface 114. The first inner-circumferential surface 114 is parallel to the rotational axis 148 of the first seal ring 102. The first circumferential surface 112 may also be parallel to the rotational axis 148, so that the first inner-circumferential surface 114 and the first circumferential surface 112 are parallel. However, in other examples, the first circumferential surface 112 may be non-parallel with the first inner-circumferential surface 114 and the rotational axis 148. Two side faces, a first sealing face 108 and a first non-sealing face 110, extend between the first inner-circumferential surface 114 and the first circumferential surface 112. In some examples, the first sealing face 108 and the first non-sealing face 110 are parallel to one another. However, in other examples, the first sealing face 108 and the first non-sealing face 110 may be non-parallel. The first sealing face 108 is configured to form one surface of a sealing interface 126. The first sealing face 108 is planar and perpendicular to the rotational axis 148 of the first seal ring 102. The first seal ring 102 is mounted on the shaft 146, such that the first seal ring 102 is co-rotatable with the shaft 146. That is, both the first seal ring 102 and the shaft 146 rotate, together, at a rotational speed ω about the rotational axis 148.

The first seal ring 102 is made of a ductile material. In some examples, the first seal ring 102 is made of a hardened steel material. In other examples, the first seal ring 102 may be made of other materials such as tungsten carbide, silicon carbide, or a ceramic-coated steel.

Likewise, the second seal ring 104 comprises a second inner-circumferential surface 122, (i.e., an inner diameter of the second seal ring 104) and a second circumferential surface 120, spaced apart from the second inner-circumferential surface 122. The second inner-circumferential surface 122 is parallel to the rotational axis 148 of the first seal ring 102. In some examples, the second circumferential surface 120 is parallel to the rotational axis 148, such that the second inner-circumferential surface 122 and the second circumferential surface 120 are parallel surfaces. In other examples, the second circumferential surface 120 may have a planar or non-planer surface that is non-parallel with the second inner-circumferential surface 122, such as a second circumferential surface 120 that is angled, relative to the rotational axis 148. In yet other examples, the second circumferential surface 120 may have a non-planar surface, such as a curved surface, grooved or ribbed surface, stepped surface, etc. A second sealing face 116 and a second non-sealing face 118, extend between the second inner-circumferential surface 122 and the second circumferential surface 120. In some examples, the second sealing face 116 and the second non-sealing face 118 are parallel to one another. The second sealing face 116 is configured to form another one of the surfaces of the sealing interface 126.

The sealing interface 126 defines a primary seal 128 of the sealing assembly 100. As used herein, the sealing interface 126 is a specific region where two mating surfaces are in close contact or connection to create a seal that helps prevent leakage of fluids between the mating surfaces. That is, the first sealing face 108 and the second sealing face 116 form the two mating surfaces of the sealing interface 126. Accordingly, the second sealing face 116 is planar and perpendicular to the rotational axis 148 of the first seal ring 102. The second seal ring 104 is configured to be stationary (i.e., non-rotating), relative to the first seal ring 102 and the shaft 146. Although not shown in the figures, the second seal ring 104 is configured to be mounted to a housing, which is also stationary.

In some examples, the second seal ring 104 is made of a carbon-based material, that is a material at least partially made of or including carbon. For example, the second seal ring 104 may be made of a carbon graphite material with the second sealing face 116 having a smooth planar surface, such that little friction is created between the first sealing face 108 and the second sealing face 116, when the first seal ring 102 is rotating relative to the second seal ring 104. In other examples, the second sealing face 116 is formed of a carbon graphite or other carbon-based material, while other surfaces, such as the second circumferential surface 120 may be coated in other materials.

Figure 4:
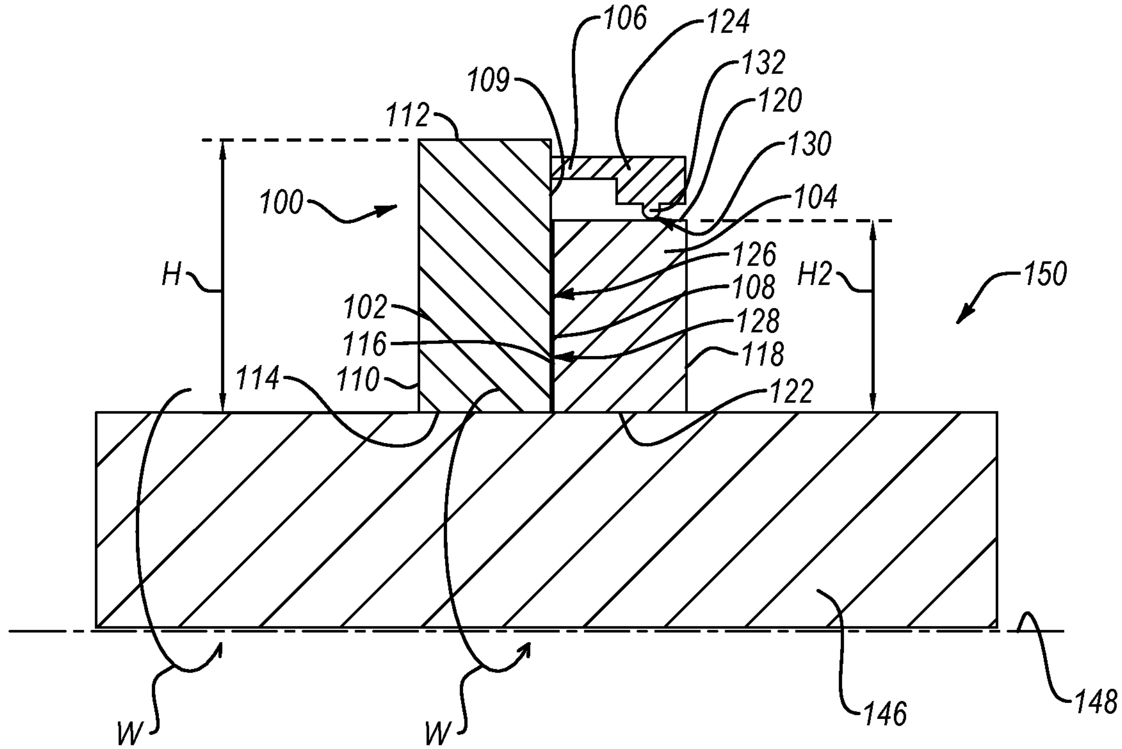
FIG. 4 is a schematic cross-sectional partial view of another embodiment of a sealing assembly on a shaft, according to one or more examples of the present disclosure.

The resilient flexible seal 106 is coupled to the first seal ring 102. Accordingly, the resilient flexible seal 106 is co-rotatable with the first seal ring 102. The resilient flexible seal 106 can be coupled to the first seal ring 102 through various methods. For example, the resilient flexible seal 106 may be integrally machined with the first seal ring 102, such that the resilient flexible seal 106 and first seal ring 102 form a single, continuous part. Additionally, the resilient flexible seal 106 may be coupled to the first seal ring 102 through mechanical fastening, such as using screws, bolts, or other fasteners, adhered through the use of adhesives or bonding agents, or compression-fitted to ensure a secure and reliable connection, etc. As shown in FIG. 2, the resilient flexible seal 106 is coupled to the first circumferential surface 112 of the first seal ring 102, however in other examples, the resilient flexible seal 106 may be coupled at other locations of the first seal ring 102, as shown in FIG. 4. The resilient flexible seal 106 includes an extension member 124. The extension member 124 is configured to sealingly engage with the second circumferential surface 120 of the second seal ring 104, such that a secondary seal 130 is defined between the extension member 124 of the resilient flexible seal 106 and the second circumferential surface 120, when the first seal ring 102 is below a threshold speed (i.e., rotational speed). The extension member 124 is further configured to disengage from the second circumferential surface 120 when the first seal ring 102 is rotating, relative to the second seal ring 104, at or above the threshold speed. That is, when the first seal ring 102 is rotating at or above the threshold speed, the secondary seal 130 is not sealed between the extension member 124 and the second circumferential surface 120. As used herein the threshold speed refers to a rotational speed at which the extension member 124 disengages (i.e., breaks) from the second circumferential surface 120.

In some examples, the threshold speed is associated with a centrifugal force generated by the first seal ring 102 rotating about the rotational axis 148, that is sufficient to radially flex (e.g., deform) the extension member 124 away from the second circumferential surface 120. In other examples, the threshold speed may be associated with aerodynamic or hydrodynamic forces acting on the extension member 124, that cause the extension member 124 to disengage from the second circumferential surface 120. That is, aerodynamic forces can exert pressure on the extension member 124, pushing the extension member 124 away from the second circumferential surface 120, due to the interaction between the moving air or gas and the shape and orientation of the extension member 124, effectively lifting it away from the surface and breaking the secondary seal 130. Similarly, when the sealing assembly 100 is operating in a fluid medium such as a liquid, the fluid flow around the extension member 124 can generate hydrodynamic forces that push the extension member 124 away from the second circumferential surface 120. Additionally, in certain cases, the threshold speed could be linked to thermal effects. For example, the extension member 124 may be coated with a layer of paraffin wax, having a defined melting point, when the first seal ring 102 reaches the threshold speed, the heat generated due to friction and rotation causes the paraffin wax to melt, reducing the adhesion between the extension member 124 and the second circumferential surface 120, allowing the extension member 124 to move away from the second circumferential surface 120. Although mainly described throughout with regards to a centrifugal force, any of the above mentioned forces may be used to sealingly engage and disengage the extension member 124 and the second seal ring 104.

The extension member 124 has a spring rate that determines the speed at which the extension member 124 will disengage from or engage with the second circumferential surface 120. That is, when the rotating first seal ring 102 begins to slow, relative to the second seal ring 104, the extension member 124 will remain disengaged from the second circumferential surface 120 until the first seal ring 102 is rotating below the threshold speed, when the extension member 124 will engage with the second circumferential surface 120. A size, a thickness, a length, or a shape of the extension member 124 may be changed to adjust the spring rate of the extension member 124. For example, the thickness of the extension member 124 can be increased to increase the rotational speed of the first seal ring 102 at which the extension member 124 will disengaged from the second circumferential surface 120 of the second seal ring 104. In some examples, the strength of the sealing engagement between the extension member 124 and the second circumferential surface 120 can vary. For example, the extension member 124 may have a weak engagement with the second circumferential surface 120 while the first seal ring 102 is rotating below the threshold speed and a stronger engagement with the second circumferential surface 120 when the first seal ring 102 is stationary, relative to the second seal ring 104. As friction and heat generation will occur between the extension member 124 and the second circumferential surface 120, when they are in contact and the first seal ring 102 is rotating, a weaker engagement at the secondary seal 130 can reduce wear to the surfaces. Moreover, the extension member 124 is designed to disengage with the second circumferential surface 120 before the friction and heat generation can adversely affect the performance, durability, and lifespan of the resilient flexible seal 106. In some examples, the extension member 124 is configured to disengage with the second circumferential surface 120 when the rotational speed ω of the first seal ring 102 about the rotational axis 148 is at or above 10% of the maximum speed of the first seal ring 102. In other examples, the extension member 124 is configured to disengage with the second circumferential surface 120 when the rotational speed ω of the first seal ring 102 about the rotational axis 148 is at or above 20% of the maximum speed of the first seal ring 102. In yet other examples, the extension member 124 is configured to disengage with the second circumferential surface 120 when the rotational speed ω of the first seal ring 102 about the rotational axis 148 is between, and inclusive of, 1% and 50% of the maximum speed of the first seal ring 102.

The extension member 124 of the resilient flexible seal 106 is made of a material that is capable of radially flexing away from the second circumferential surface 120. That is, the extension member 124 is made of a material that allows the extension member 124 to deform when subjected to centrifugal forces and promptly return to its original shape when the centrifugal force is reduced or eliminated. As used herein deform refers to any movement in the extension member 124 that moves the extension member 124 away from the second circumferential surface 120, including but not limited to, bending, twisting, or lifting. In other words, the material exhibits elastomeric properties. In some examples, the extension member 124 may be formed of a polymeric material. For example, the extension member 124 may be made of a natural rubber, synthetic rubber, polyurethane, various elastomeric thermoplastics, Teflon, etc. In other examples, the extension member 124 may be formed of other materials, such as, flexible metals, composite materials, spring-energized elastomeric materials, reinforced elements, etc. Alternatively, or additionally, in some examples, the second circumferential surface 120 can be coated with a layer of elastomeric material. The elastomeric coating may enhance the sealing capabilities of the secondary seal 130 and reduce friction and wear of the extension member 124. In such cases, the extension member 124 may be formed of a metallic material, which can provide strength and wear resistance to the extension member 124.

In some examples, the entirety of the resilient flexible seal 106 is made of a material that is capable of radially flexing away from the second circumferential surface 120 at the same spring rate. In other examples, a portion of the resilient flexible seal 106, other than the extension member 124, may be made of a material that radially flexes away from the second circumferential surface 120 at a different spring rate from the extension member 124. For example, a portion of the resilient flexible seal 106 may have a spring rate that prevents the portion from radially flexing away from the second circumferential surface 120 at or above the threshold speed.

Figure 2A:
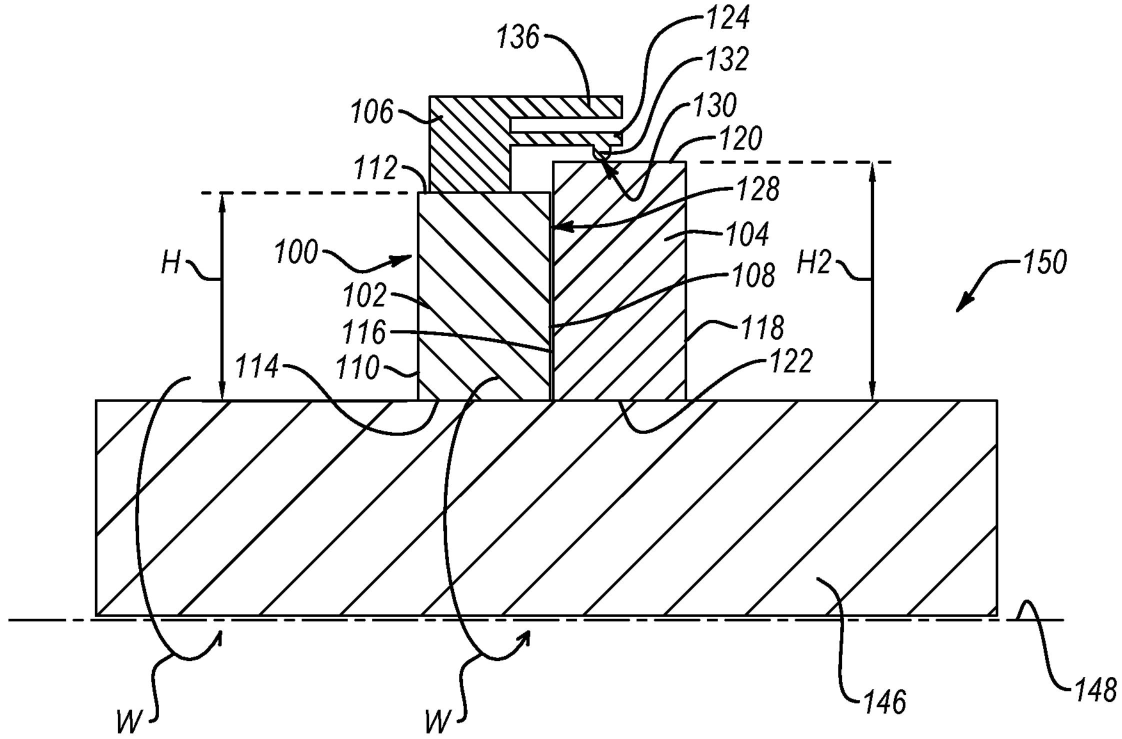
FIG. 2A is a schematic cross-sectional partial view of a sealing assembly on a shaft, with an extension member sealingly engaged with a second seal ring, according to one or more examples of the present disclosure.
Figure 2B:
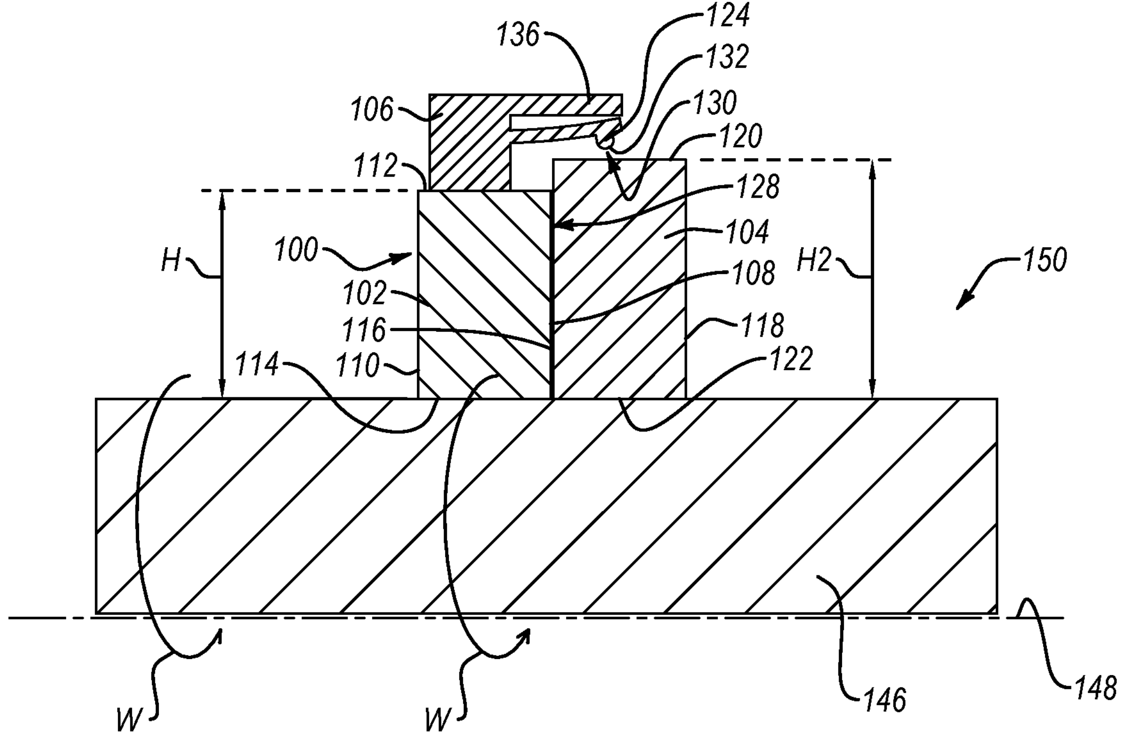
FIG. 2B is a schematic cross-sectional partial view of the sealing assembly of FIG. 2A, with the extension member disengaged from the second seal ring, according to one or more examples of the present disclosure.

As shown in FIGS. 2A and 2B, the resilient flexible seal 106, in some examples, includes a second extension member 136. The second extension member 136 is radially spaced apart from the extension member 124. That is, the second extension member 136 is spaced at a greater distance from the second circumferential surface 120 than the extension member 124. The second extension member 136 is more rigid than the extension member 124, such that the second extension member 136 does not radially flex away from the second circumferential surface 120 at the same spring rate as the extension member 124. Consequently, the second extension member 136 does not undergo the same degree of radial flexing as the extension member 124, when subjected to comparable forces. As shown in FIG. 2A, the first seal ring 102 is at rest or below the threshold speed, such that the extension member 124 is sealingly engaged with the second seal ring 104, and the extension member 124 is not contacting the second extension member 136. During operation, when the first seal ring 102 reaches or surpasses the threshold speed, the extension member 124 will radially flex toward the second extension member 136 due to the centrifugal forces. As the rotational speed ω of the first seal ring 102 continues to increase, a gap between the extension member 124 and the second extension member 136 will gradually decrease until the extension member 124 contacts the second extension member 136 at some rotational speed ω above the threshold speed. As shown in FIG. 2B, the rotational speed ω of the first seal ring 102 is above the threshold speed and at a rotational speed ω in which the extension member 124 is contacting the second extension member 136. Accordingly, the second extension member 136 is configured to prevent the further flexing of the extension member 124 beyond the second extension member 136. That is, the second extension member 136 acts as a positional limiter, ensuring that the extension member 124 maintains a controlled degree of radial flexing while the first seal ring 102 is rotating, helping to prevent fatigue or possible damage to the extension member 124.

Figure 3A:
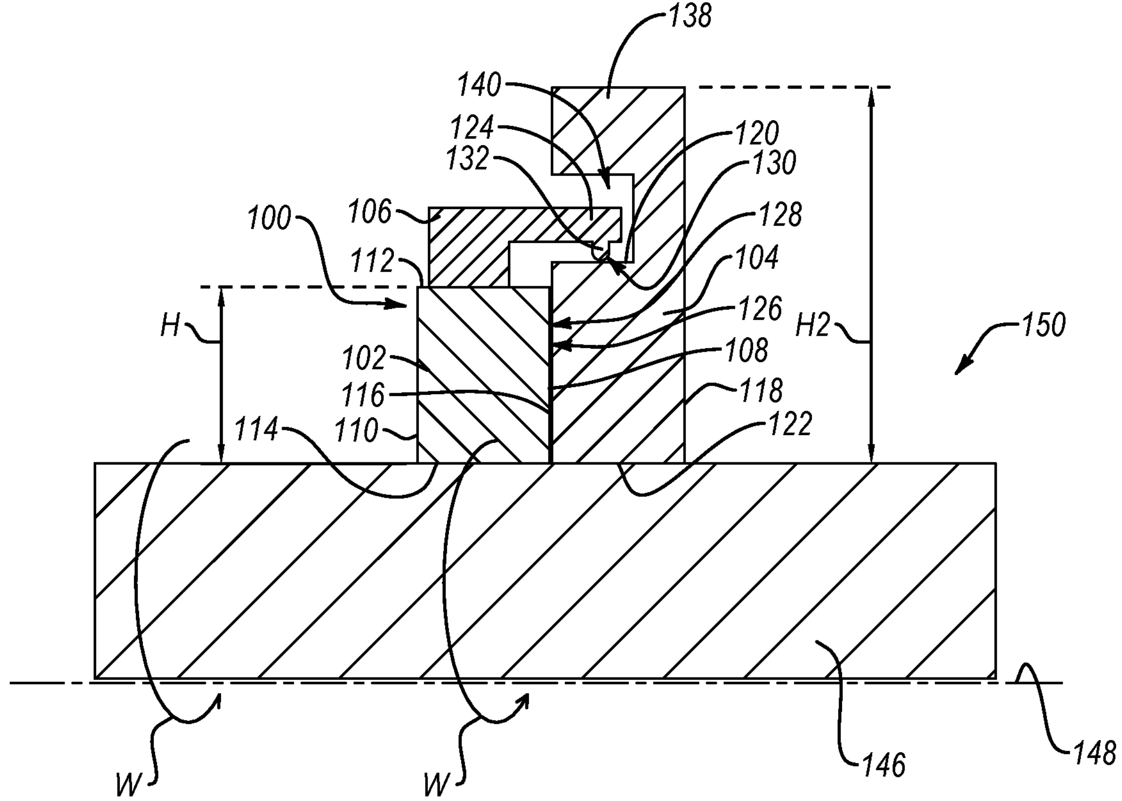
FIG. 3A is a schematic cross-sectional partial view of another embodiment of a sealing assembly on a shaft, with an extension member sealingly engaged with a second seal ring, according to one or more examples of the present disclosure.
Figure 3B:
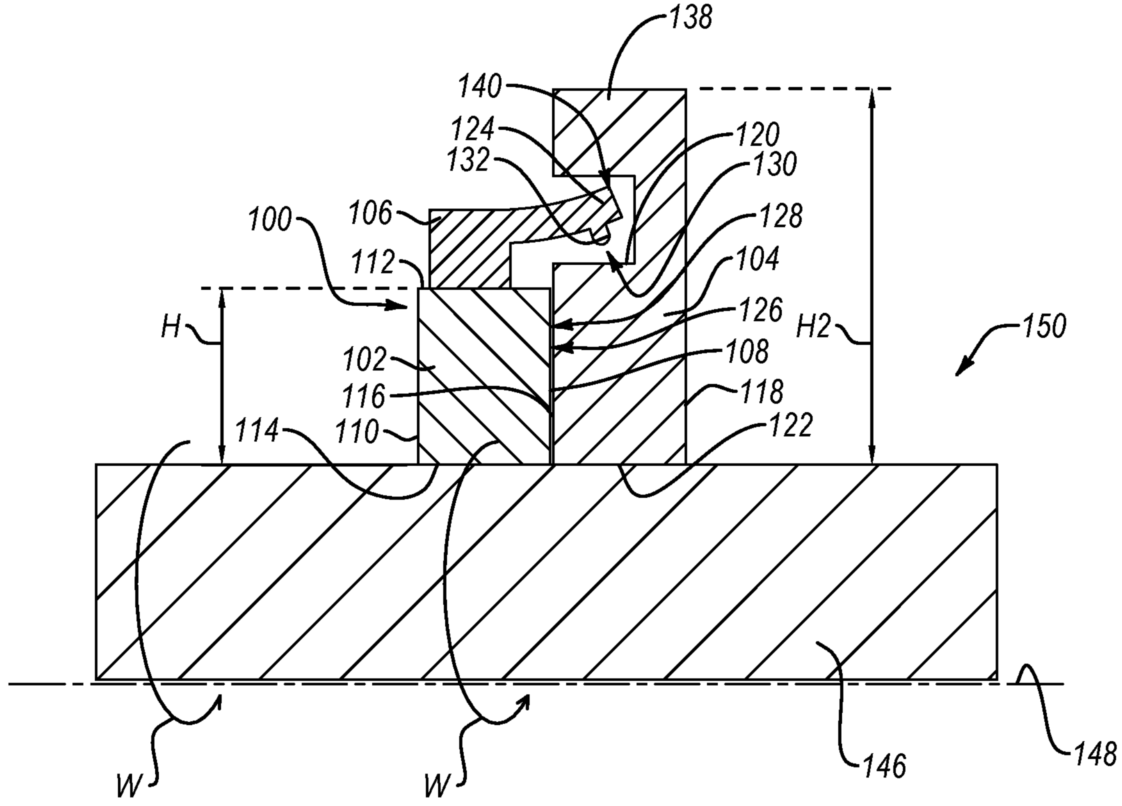
FIG. 3B is a schematic cross-sectional partial view of the sealing assembly of FIG. 3A, with the extension member disengaged from the second seal ring, according to one or more examples of the present disclosure.

Alternatively, a positional limiter of the radial flexing of the extension member 124 may be formed on the second seal ring 104. For example, as shown in FIGS. 3A and 3B, the second seal ring 104 includes a secondary member 138 that radially extends from the second circumferential surface 120. The extension member 124 is configured to extend within a notch 140 defined in the secondary member 138. As the secondary member 138 is an extension of the second seal ring 104, the secondary member 138 does not rotate, relative to the first seal ring 102. As shown in FIG. 3A, the first seal ring 102 is at rest or below the threshold speed, such that the extension member 124 is sealingly engaged with the second seal ring 104, and the extension member 124 is not contacting the secondary member 138. During operation, when the first seal ring 102 reaches or surpasses the threshold speed, the extension member 124 will radially flex toward the secondary member 138 due to the centrifugal forces. As the rotational speed ω of the first seal ring 102 continues to increase, a gap between the extension member 124 of the secondary member 138 will gradually decrease until the extension member 124 contacts the secondary member 138 at some rotational speed ω above the threshold speed. As shown in FIG. 3B, the rotational speed ω of the first seal ring 102 is above the threshold speed and at a rotational speed ω in which the extension member 124 is contacting the secondary member 138. Accordingly, the secondary member 138 is configured to prevent the further flexing of the extension member 124 beyond the secondary member 138. As the extension member 124 is in motion when it comes into contact with the secondary member 138, the contact between the extension member 124 and the secondary member 138 may cause some friction leading to potential wear on the surfaces and additional heat generation. To mitigate such effects, the extension member 124 may be configured to only contact the secondary member 138 at rotational speeds ω that surpass the normal operational rotational speeds ω of the first seal ring 102.

In some examples, a first profile height H of the first seal ring 102 is less than a second profile height H2 of the second seal ring 104. For examples, as shown in FIG. 2, the first profile H of the first seal ring 102 is less than the second profile height H2 of the second seal ring 104. In other words, the second circumferential surface 120 of the second seal ring 104 extends at a further distance from the rotational axis 148 than the first circumferential surface 112 of the first seal ring 102 extends from the rotational axis 148. The resilient flexible seal 106 is coupled to the first circumferential surface 112 at the first profile height H and the extension member 124 is configured to sealingly engage and disengage with the second circumferential surface 120 at the second profile height H2. In other examples, the first profile height H of the first seal ring 102 is greater than the second profile height H2 of the second seal ring 104, such as shown in FIG. 4. In such examples, the resilient flexible seal 106 may be coupled to the first seal ring 102 at a location other than the first circumferential surface 112. For example, the resilient flexible seal 106 may be coupled to an attachment surface 109 that radially extends from the first sealing face 108 of the first seal ring 102. The attachment surface 109 is parallel with or co-planar to the first sealing face 108. The extension member 124 of the resilient flexible seal 106 is configured to sealingly engage with the second circumferential surface 120 of the second seal ring 104 when the first seal ring 102 is below the threshold speed. The extension member 124 is further configured to disengage from the second circumferential surface 120 when the first seal ring 102 is rotating, relative to the second seal ring 104, at or above the threshold speed. In yet other examples, the resilient flexible seal 106 may be coupled to the first seal ring 102 at multiple surfaces. For example, the resilient flexible seal 106 is coupled to the first circumferential surface 112 and the attachment surface 109, such that the resilient flexible seal 106 wraps around an edge of the first seal ring 102.

Figure 5A:
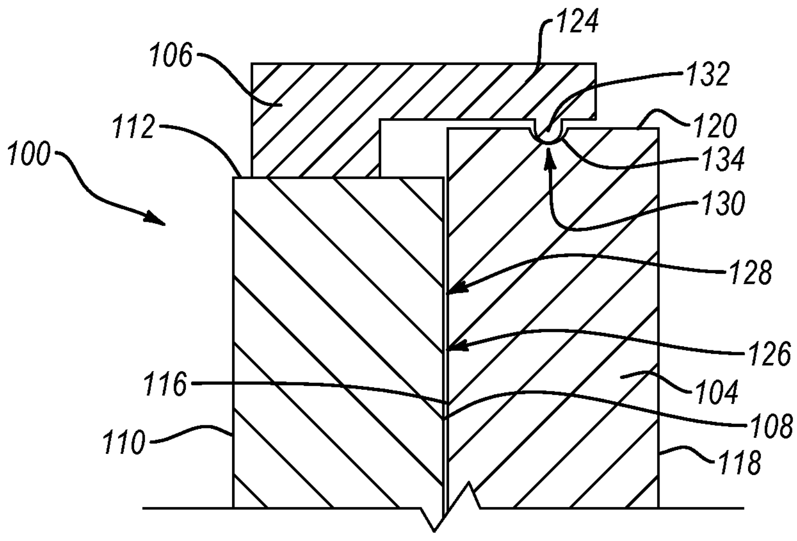
FIG. 5A is a schematic cross-sectional partial view of a first seal ring, a second seal ring, and a resilient flexible seal of a sealing assembly, according to one or more examples of the present disclosure.
Figure 5B:
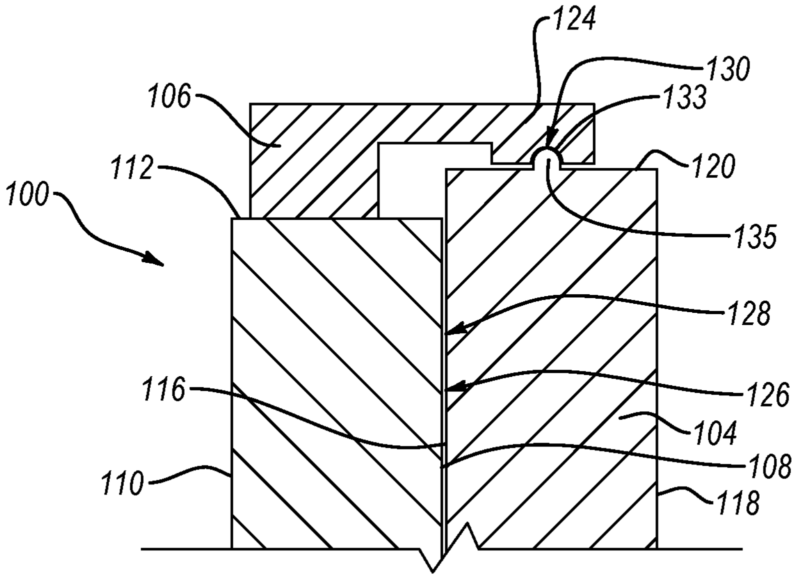
FIG. 5B is a schematic cross-sectional partial view of another embodiment of a first seal ring, a second seal ring, and a resilient flexible seal of a sealing assembly, according to one or more examples of the present disclosure.

Referring to FIGS. 5A and 5B, in some examples, the extension member 124 of the resilient flexible seal 106 includes an annular rib 132 or an annular groove 133. The annular rib 132 or the annular groove 133 of the extension member 124 is configured to be in sealed engagement with the second circumferential surface 120 of the second seal ring 104 when the rotational speed ω of the first seal ring 102 is below the threshold speed. As shown in FIG. 5A, the extension member 124 includes an annular rib 132. The annular rib 132 is configured to contact the second circumferential surface 120 of the second seal ring 104. In some examples, the second circumferential surface 120 has a corresponding annular groove 134. Accordingly, the annular rib 132 of the extension member 124 is configured to be in sealed engagement with the annular groove 134 when the rotational speed ω of the first seal ring 102 is below the threshold speed. As shown in FIG. 5B, the extension member 124 includes an annular groove 133. The annular groove 133 is configured to contact the second circumferential surface 120 of the second seal ring 104. In some examples, the second circumferential surface 120 has a corresponding annular rib 135. The annular groove 133 of the extension member 124 is configured to be in sealed engagement with the annular rib 135 when the rotational speed ω of the first seal ring 102 is below the threshold speed. Although the extension member 124 is shown having one annular rib 132 or one annular groove 133, in some examples, the extension member 124 could include multiple annular ribs or multiple annular grooves to increase the surface area between the extension member 124 and the second circumferential surface 120, when the resilient flexible seal 106 is sealingly engaged with the second seal ring 104. Likewise, the second circumferential surface 120 could include multiple annular ribs or multiple annular grooves.

Figure 6:
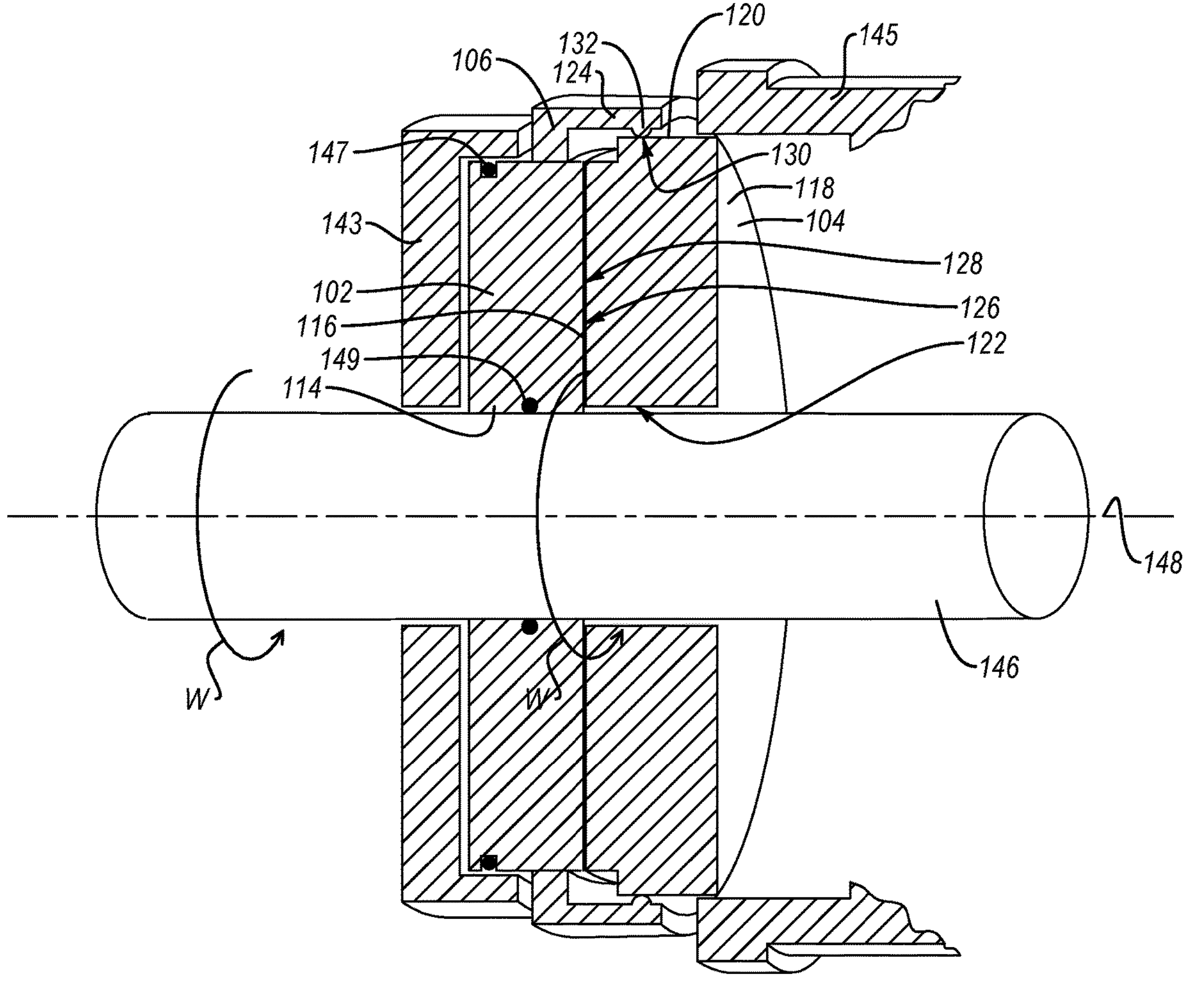
FIG. 6 is a schematic cross-sectional view of a shaft assembly, according to one or more examples of the present disclosure.

Referring to FIG. 6, a perspective cross-section view of a shaft assembly 150 is shown. The shaft assembly 150 includes a shaft 146, a housing 145, adjacent to the shaft 146, and a sealing assembly 100, operatively positioned between the shaft 146 and the housing 145. The first seal ring 102 is mounted to the shaft 146 and may include an o-ring 149 that securely positions the first seal ring 102 on the shaft 146, such that the shaft 146 and the first seal ring 102 are co-rotatable at a rotational speed ω. The second seal ring 104 is mounted to the housing 145, which is stationary, relative to the shaft 146. As such, the second seal ring 104, together with the housing 145, do not rotate relative to the shaft 146. The sealing assembly 100 may include other features, such as an outer housing cap 142 surrounding at least part of the second seal ring 104, as shown in FIG. 1. The outer housing cap 142 can be between the second seal ring 104 and the housing 145. Additionally, of alternatively, the sealing assembly 100 may include a mating cap 143, adjacent to the first seal ring 102. The mating cap 143 may be attached to the first seal ring 102 by an o-ring 147, such that the mating cap 143 is rotatable with the first seal ring 102. The mating cap 143 is configured to help maintain the primary seal 128 between the first seal ring 102 and the second seal ring 104.

The sealing assembly 100 may be used in various devices between a rotating shaft 146 and a stationary housing 145. For example, the sealing assembly 100 may be used in a compressor used for refrigeration, such as a compressor used for refrigeration on an aircraft.

Figure 7:
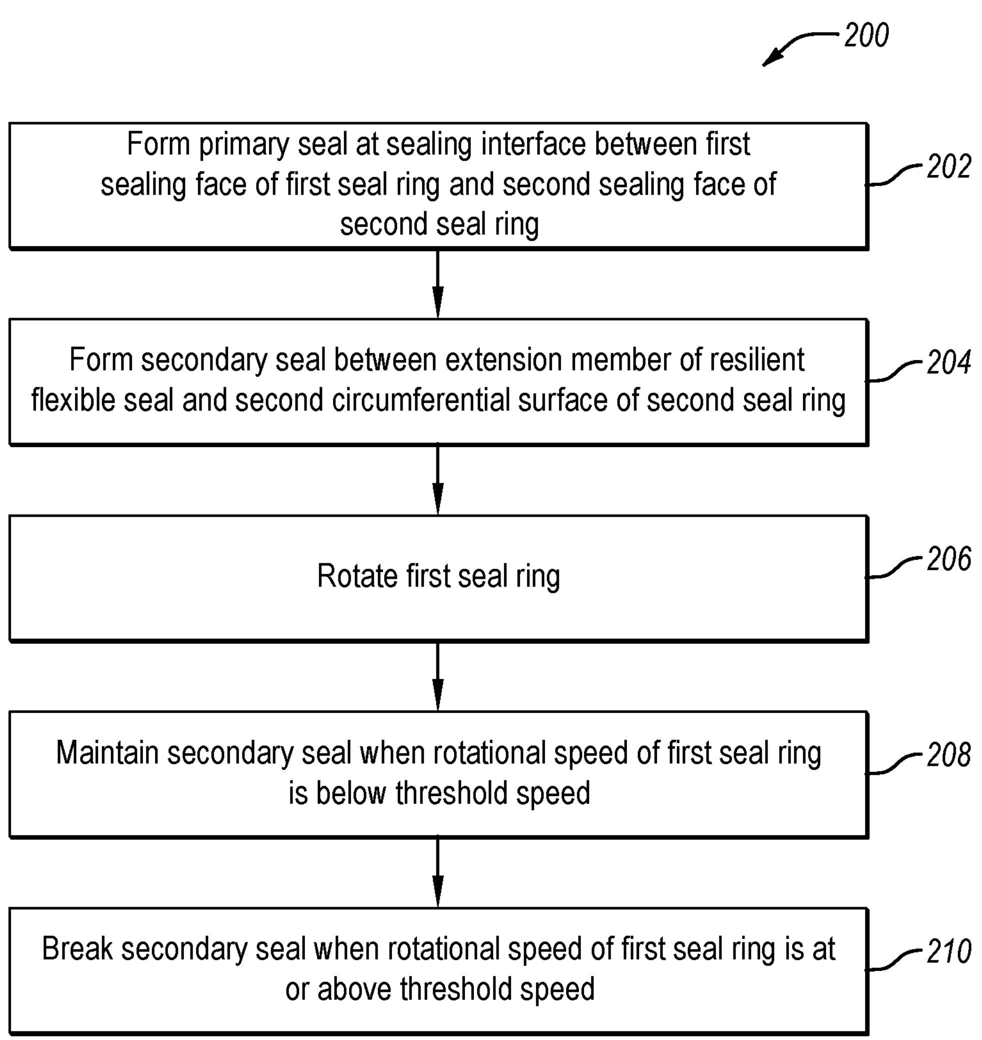
FIG. 7 is a schematic flow diagram of a method of sealing a compressor using a sealing assembly, according to one or more examples of the present disclosure.

Referring to FIG. 7, according to some examples, a method 200 of sealing a compressor using a sealing assembly 100 is shown. The compressor may be a refrigeration device, such a refrigeration device used on a vehicle or aircraft. The method 200 includes (block 202) forming a primary seal 128 at a sealing interface 126 between a first sealing face 108 of a first seal ring 102 and a second sealing face 116 of a second seal ring 104. The primary seal 128 is configured to be a dynamic seal that seals the sealing assembly 100 when the first seal ring 102 is rotating relative to the second seal ring 104. The method 200 also includes (block 204) forming a secondary seal 130 between an extension member 124 of a resilient flexible seal 106 and a second circumferential surface 120 of the second seal ring 104. The secondary seal 130 is configured to be a static seal that seals the sealing assembly 100 when the first seal ring 102 is stationary or rotating at a minimal speed, relative to the second seal ring 104.

The method further includes (block 206) rotating the first seal ring 102, relative to the second seal ring 104. The first seal ring 102 is configured to be mounted to a shaft, such that the first seal ring 102 is co-rotates with and at the same rotational speed as the shaft. The method additionally includes (block 208) maintaining the secondary seal 130 when a rotational speed of the first seal ring 102 is below a threshold speed. In some examples, the extension member 124 of the resilient flexible seal 106 includes one of an annular rib 132 or an annular groove 133 and the secondary seal 130 is formed between the annular rib 132 of the annular groove 133 of the extension member 124 and the second circumferential surface 120 of the second seal ring 104. The method also includes (block 210) breaking the secondary seal when the rotational speed of the first seal ring 102 is at or above the threshold speed. That is, when the rotational speed of the first seal ring 102 is at or above the threshold speed and generating a centrifugal force that is sufficient to radially flex the extension member 124 away from the second circumferential surface 120.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A mechanical sealing assembly comprising:

a primary seal at a primary sealing interface between a first sealing face of a first seal ring and a second sealing face of a second seal ring; and a secondary seal at a secondary sealing interface between an extension member of a resilient flexible seal and a second circumferential surface of the second seal ring, the resilient flexible seal coupled to the first seal ring;

wherein:

the first seal ring is rotatable, about a rotational axis, relative to the second seal ring;

the first sealing face and the second sealing face are angled relative to the rotational axis;

the secondary sealing interface of the secondary seal is radially outward of a radially outermost portion of the primary sealing interface of the primary seal; and the extension member is configured to disengage from the second circumferential surface when the first seal ring is rotating, relative to the second seal ring, at or above a threshold speed.

2. The mechanical seal assembly of claim 1, wherein:

the first seal ring comprises the first sealing face, a first non-sealing face, opposite the first sealing face, and a first circumferential surface;

the second seal ring comprises the second sealing face, a second non-sealing face, opposite the second sealing face, and the second circumferential surface; and the resilient flexible seal is co-rotatable relative to the first seal ring;

wherein:

when a rotational speed of the first seal ring is below the threshold speed, the extension member is in sealed engagement with the second circumferential surface of the second seal ring; and when the rotational speed of the first seal ring is at or above the threshold speed, the extension member is flexed radially away from the second circumferential surface and is disengaged from the second circumferential surface of the second seal ring.

3. The mechanical seal assembly of claim 1, wherein the first sealing face and the second sealing face are planar and perpendicular relative to the rotational axis.

4. The mechanical seal assembly of claim 1, wherein the resilient flexible seal is coupled to a first circumferential surface.

5. The mechanical seal assembly of claim 1, wherein the resilient flexible seal is coupled to an attachment surface of the first seal ring, the attachment surface parallel with or co-planar to the first sealing face.

6. The mechanical seal assembly of claim 2, wherein the extension member of the resilient flexible seal comprises one of an annular rib or an annular groove configured to be in sealed engagement with the second circumferential surface when the rotational speed of the first seal ring is below the threshold speed.

7. The mechanical seal assembly of claim 2, wherein:

the second circumferential surface comprises one of an annular rib or an annular groove;

when the second circumferential surface comprises the annular rib, the extension member comprises a corresponding annular groove, the annular rib of the second circumferential surface configured to be in sealed engagement with the annular groove of the extension member when the rotational speed of the first seal ring is below the threshold speed; and when the second circumferential surface comprises the annular groove, the extension member comprises a corresponding annular rib, the annular rib of the extension member configured to be in sealed engagement with the annular groove of the second circumferential surface when the rotational speed of the first seal ring is below the threshold speed.

8. The mechanical seal assembly of claim 1, wherein the threshold speed is a speed at which a centrifugal force is sufficient to radially flex the extension member away from the second circumferential surface.

9. The mechanical seal assembly of claim 1, wherein the extension member of the resilient flexible seal is made of an elastomeric material.

10. The mechanical seal assembly of claim 1, wherein the second seal ring is made of a carbon-based material.

11. The mechanical seal assembly of claim 1, wherein:
the first seal ring has a first profile height;
the second seal ring comprises a second profile height; and
the second profile height is greater than the first profile height.

12. The mechanical seal assembly of claim 2, wherein:
the resilient flexible seal further comprises a second extension member;
the second extension member is radially spaced apart from the extension member; and
the second extension member is more rigid than the extension member, wherein:
the extension member flexes towards the second extension member when the rotational speed of the first seal ring is at or above the threshold speed; and
the second extension member prevents further flexing of the extension member beyond the second extension member.

13. The mechanical seal assembly of claim 1, wherein:
the second seal ring further comprises a secondary member radially extending from the second circumferential surface;
a notch is defined in the secondary member;
the extension member of the resilient flexible seal extends within the notch; and
the notch prevents further flexing of the extension member beyond the notch.

14. The mechanical sealing assembly of claim 1, wherein the first seal ring, including the first sealing face, is made of one of a hardened steel material, tungsten carbide, silicon carbide, or a ceramic-coated steel.

15. The mechanical sealing assembly of claim 14, wherein the second seal ring is made of a carbon-based material.

16. A shaft assembly, comprising:
a housing;
a shaft adjacent to the housing and rotatable, relative to the housing; and
a mechanical sealing assembly configured to be operatively positioned between the shaft and the housing, the mechanical sealing assembly comprising;
a primary seal at a primary sealing interface;
a secondary seal at a secondary sealing interface;
a first seal ring, mountable to the shaft, and comprising a first sealing face, a first non-sealing face, opposite the first sealing face, and a first circumferential surface;
a second seal ring, mountable on the housing, and comprising a second sealing face, a second non-sealing face, opposite the second sealing face, and a second circumferential surface, wherein:
the first sealing face and the second sealing face are engaged to form the primary seal such that the primary sealing interface is defined between the first sealing face and the second sealing face;
the first seal ring is co-rotatable with the shaft, about a rotational axis, relative to the second seal ring;
the first sealing face and the second sealing face are angled relative to the rotational axis; and
the second seal ring is stationary, such that the second seal ring does not rotate, relative to the first seal ring and the shaft; and
a resilient flexible seal coupled to and co-rotatable with the first seal ring, and comprising an extension member, wherein:
the secondary seal is between the extension member and the second circumferential surface;
the secondary sealing interface of the secondary seal is radially outward of a radially outermost portion of the primary sealing interface of the primary seal;
when a rotational speed of the first seal ring is below a threshold speed, the extension member is in sealed engagement with the second circumferential surface of the second seal ring to form the secondary seal; and
when the rotational speed of the first seal ring is at or above the threshold speed, the extension member is flexed radially away from the second circumferential surface and is disengaged from the second circumferential surface of the second seal ring.

17. The shaft assembly of claim 16, further comprising an outer housing cap, wherein the outer housing cap surrounds at least the second non-sealing face and the second circumferential surface of the second seal ring.

18. The shaft assembly of claim 16, wherein a first inner-circumferential surface of the first seal ring is in contact with the shaft such that the first seal ring and the shaft co-rotate, as the shaft is rotated.

19. The shaft assembly of claim 18, wherein the shaft assembly forms part of a compressor for an aircraft.

20. The shaft assembly of claim 16, wherein the threshold speed is a speed at which a centrifugal force is sufficient to radially flex the extension member away from the second circumferential surface.

* * * * *